(12) United States Patent
Suchland et al.

(10) Patent No.: US 9,405,964 B1
(45) Date of Patent: Aug. 2, 2016

(54) PROCESSES FOR GENERATING CONTENT SHARING RECOMMENDATIONS BASED ON IMAGE CONTENT ANALYSIS

(71) Applicant: AMAZON TECHNOLOGIES, INC., Reno, NV (US)

(72) Inventors: Jonathan Edward Suchland, Seattle, WA (US); Ario Jafarzadeh, Seattle, WA (US); Scott Michael Denman, Kirkland, WA (US); Mihir Kumar Choudhary, San Jose, CA (US); Daniel Hafner Cavalcanti, Bellevue, WA (US); Joshua Jacob Slimp, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/022,070

(22) Filed: Sep. 9, 2013

(51) Int. Cl.
*G06K 9/00* (2006.01)

(52) U.S. Cl.
CPC .............. *G06K 9/00288* (2013.01); *G06K 9/00* (2013.01)

(58) Field of Classification Search
CPC ............ G06Q 10/107; G06Q 30/0247; G06Q 30/0631; H04L 67/327; B29C 2045/2743; H04N 21/25808; H04N 21/25866; H04N 21/812; H04N 1/00222; H04N 1/00326; H04N 1/00376; H04N 1/00005; H04N 1/00037; H04N 2201/3266; G06K 9/72; G06K 9/3233; G06K 9/00442; G06K 2009/226; G06F 3/1296; G06F 17/30244; G07C 9/00158; G11B 27/031; B42D 2035/50; G08B 13/19613; Y10S 707/99934; A63F 13/06; G06T 19/00; G06T 19/006

USPC .................. 370/203; 382/100, 115, 118, 299; 715/700, 727, 747, 804

See application file for complete search history.

(56) References Cited

U.S. PATENT DOCUMENTS 6,714,678 B2 * 3/2004 Lapstun ............... B41J 2/17503
382/115
6,976,028 B2 * 12/2005 Fenton .............. G06F 17/30038
707/914

(Continued)

FOREIGN PATENT DOCUMENTS

EP 1223530 A3 12/2004
WO 2006041734 A2 4/2006

OTHER PUBLICATIONS

Yao et al, Context-Based Friend Suggestion in Online Photo-Sharing Community, MM '11, Nov. 28-Dec. 1, 2011, pp. 1-4.

(Continued)

*Primary Examiner* — Vu Le
*Assistant Examiner* — Aklilu Woldemariam
(74) *Attorney, Agent, or Firm* — Knobbe, Martens, Olson & Bear, LLP

(57) ABSTRACT

Processes are disclosed for generating share recommendations for sharing content based at least in part on associated metadata of the content (e.g., geo-location of the content, the date/time of the content, subject matter of the content, etc.). A quick share system may track an individual's share history, including people with whom the individual has shared content, the date/time the content was shared, the geo-location of the individual when the content was shared, etc. Share recommendations indicating one or more suggested people with whom the individual may wish to share content may be generated for the individual, based at least in part on some of a current time/date, the individual's current location, the content metadata, the individual's share history. Share recommendations may also be based in part on an event associated with the content, user feedback data for shared content, and content analysis such as image analysis for digital images.

17 Claims, 10 Drawing Sheets

(56) References Cited

U.S. PATENT DOCUMENTS

| | | | | |
|---|---|---|---|---|
| 7,095,871 | B2* | 8/2006 | Jones | G06F 17/30876 382/100 |
| 7,561,723 | B2* | 7/2009 | Goldberg | G03D 15/001 382/115 |
| 7,646,896 | B2* | 1/2010 | Yukhin | G06K 9/00255 356/603 |
| 7,894,639 | B2* | 2/2011 | Grim, III | G06F 17/30262 382/115 |
| 7,920,169 | B2 | 4/2011 | Jung et al. | |
| 8,385,971 | B2* | 2/2013 | Rhoads | G06F 178/30244 382/162 |
| 8,762,462 | B1 | 6/2014 | Duddu et al. | |
| 8,804,508 | B1* | 8/2014 | Hobbs | H04N 21/2402 370/230 |
| 2004/0183830 | A1* | 9/2004 | Cody | G06Q 10/107 715/747 |
| 2005/0010635 | A1* | 1/2005 | Schwesig | G11B 27/031 709/203 |
| 2006/0120560 | A1* | 6/2006 | Davis | G06F 17/30247 382/100 |
| 2006/0174205 | A1 | 8/2006 | Jung et al. | |
| 2006/0253782 | A1* | 11/2006 | Stark | G06F 17/30053 715/727 |
| 2007/0195373 | A1 | 8/2007 | Singh | |
| 2008/0027909 | A1 | 1/2008 | Gang et al. | |
| 2008/0071873 | A1 | 3/2008 | Gross | |
| 2008/0114844 | A1* | 5/2008 | Sanchez | G06F 9/4443 709/206 |
| 2008/0155588 | A1* | 6/2008 | Roberts | G06Q 30/00 725/34 |
| 2008/0168117 | A1* | 7/2008 | Coates | G06F 17/30867 709/201 |
| 2008/0256443 | A1 | 10/2008 | Li et al. | |
| 2009/0013347 | A1* | 1/2009 | Ahanger | G06Q 30/02 725/36 |
| 2009/0144392 | A1 | 6/2009 | Wang et al. | |
| 2009/0158206 | A1* | 6/2009 | Myllyla | G11B 27/105 715/804 |
| 2009/0254934 | A1 | 10/2009 | Grammens | |
| 2010/0115037 | A1* | 5/2010 | Hull | G06Q 30/02 709/206 |
| 2011/0004922 | A1* | 1/2011 | Bono | G06F 21/6263 726/4 |
| 2011/0013810 | A1* | 1/2011 | Engstrom | G06K 9/00288 382/118 |
| 2011/0113051 | A1 | 5/2011 | Lindahl et al. | |
| 2011/0288946 | A1* | 11/2011 | Baiya | G06F 21/10 705/26.1 |
| 2012/0027256 | A1 | 2/2012 | Kiyohara et al. | |
| 2012/0109779 | A1* | 5/2012 | Shin | G06Q 30/0633 705/26.8 |
| 2012/0109836 | A1 | 5/2012 | Chen et al. | |
| 2012/0232999 | A1* | 9/2012 | Roberts | G06Q 30/00 705/14.66 |
| 2013/0080523 | A1* | 3/2013 | Rubinstein | H04L 51/32 709/204 |
| 2013/0121584 | A1* | 5/2013 | Bourdev | G06K 9/00281 382/190 |
| 2013/0238710 | A1 | 9/2013 | Meshulam et al. | |
| 2013/0286223 | A1 | 10/2013 | Latta et al. | |
| 2013/0332855 | A1* | 12/2013 | Roman | G06F 3/0481 715/753 |
| 2013/0339358 | A1* | 12/2013 | Huibers | G06F 17/30312 707/737 |
| 2014/0032358 | A1* | 1/2014 | Perkowitz | G06F 17/2785 705/26.7 |
| 2014/0036087 | A1 | 2/2014 | Furue et al. | |
| 2014/0143666 | A1* | 5/2014 | Kennedy | H04L 67/42 715/705 |
| 2014/0215349 | A1 | 7/2014 | Kosslyn et al. | |
| 2014/0250175 | A1 | 9/2014 | Baldwin et al. | |
| 2014/0258850 | A1 | 9/2014 | Carey | |
| 2014/0321762 | A1 | 10/2014 | Pozas et al. | |
| 2014/0372902 | A1 | 12/2014 | Bryant et al. | |
| 2015/0081783 | A1 | 3/2015 | Gong et al. | |

OTHER PUBLICATIONS

Photobucket, Share Your Stories, http://photobucket.com/learn/share, last accessed Sep. 13, 2013, pp. 1-2.

Photobucket Support, One Click Sharing, http://photobucket.zendesk.com/entries/21851323, Aug. 13, 2012 (last accessed Sep. 13, 2013), pp. 1-2.

Photobucket Support, Sharing with Social Buttons, http://photobucketzendesk.com/entries/21786493-Sharing-With-Social-Buttons-, Jul. 31, 2012 (last accessed Sep. 13, 2013), pp. 1-3.

Photobucket Support, Share from your Photobucket, http://photobucketzendesk.com/entries/21819723-Share-from-your-Photobucket, Aug. 7, 2012 (last accessed Sep. 13, 2013), pp. 1-4.

Instagram Home Page, http://instagram.com/, last accessed Sep. 13, 2013, p. 1.

Pinterest Image Share Screenshots, iOS application (as captured Aug. 14, 2013), pp. 1-5.

Shutterfly, Free Online Photo Sharing, http://www.shutterfly.com/nav/signedOutShare.sfly, last accessed Sep. 13, 2013, p. 1.

Flickr, Help Sharing, http://www.flickr.com/help/sharing/, last accessed Sep. 13, 2013, p. 1-6.

* cited by examiner

PROCESSES FOR GENERATING CONTENT SHARING RECOMMENDATIONS BASED ON IMAGE CONTENT ANALYSIS

BACKGROUND

A variety of personal electronic devices, services and applications exist that enable users to connect with each other and share content, such as photos and videos. However, choosing what content to share and who to share it with can be cumbersome. The task of specifying the recipient(s) can also be burdensome, especially for users who have large numbers of contacts.

BRIEF DESCRIPTION OF THE DRAWINGS

The drawings are provided to illustrate example embodiments described herein and are not intended to limit the scope of the disclosure.

DETAILED DESCRIPTION

Overview

Figure 1:
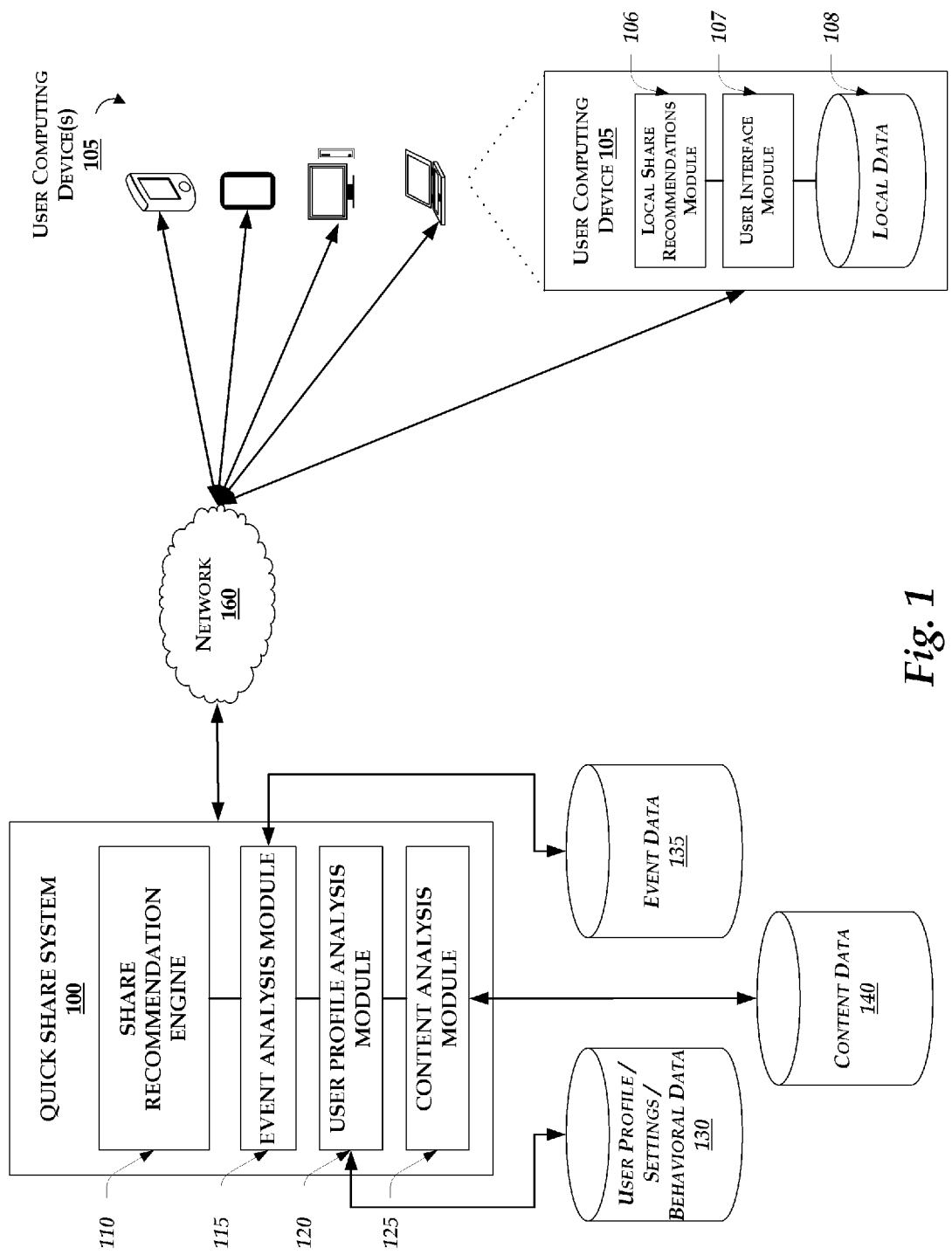
FIG. 1 is a block diagram depicting an illustrative network environment in which a quick share system may operate.

A system is disclosed that assists users in identifying target recipients for sharing specific content items, such as specific photos, videos, or other items of user-generated content. The system, referred to as a "quick share" system, generates share recommendations for specific content items and users based on content metadata, user share histories, and/or other types of information. For example, for a photo or video captured by a smartphone user, the system may generate share recommendations based at least in part on associated metadata of the content (e.g., geo-location of where the photo or video was taken, the date/time the photo or video was taken, facial recognition, etc.). A quick share system as described herein may track an individual's share history, activity and/or behavior, including for example a list of people with whom the individual has shared content, the time of day the content is shared, the geo-location of the content indicating when the content was captured, created or uploaded, the geo-location of the individual sharing the content at the time it was shared, and so on. When an item of content is to be shared by the individual, based at least in part on a current time/date, the individual's current location (e.g., based on geo-location data, for example as accessed or available from a user's computing device configured to provide and/or support location services such as Global Positioning System ["GPS"]), the content metadata, and/or the individual's previous share history, a list of suggested people (e.g., potential sharees or share recipients) with whom the individual may wish to share the item of content may be provided to make it easy to select the share recipients. The quick share system can log, track, and learn the individual's sharing behavior over time and offer suggestions, or share recommendations, based at least upon the aforementioned criteria.

A few example scenarios will illustrate some of the features and benefits of quick share systems and methods as described herein. In one example scenario, an employee at work takes a photo of a whiteboard using his/her personal electronic device equipped with a digital camera. Either when the employee takes the photo or selects the photo for sharing when the employee takes the photo or immediately after, a list of people the employee typically shares with under this circumstance may be generated or accessed by the quick share system (e.g., the employee is physically located at work, the photo was taken at the office, and the employee typically shares with co-workers). From the list, three co-workers may be identified by the quick share system and displayed via a user interface on the electronic device with a call to action to share the photo with these three co-workers. The employee may select, for example, two of the co-workers, add an additional person by typing in his/her email address or mobile phone number, and "quick share" the whiteboard photo with these share recipients in a matter of seconds.

In another example scenario, an individual is at work and reflecting on his recent vacation photos. As he browses his photos, a list of people may appear to share the photos with. Although he is at work, the list of suggested people may not include co-workers, but instead includes his parents, grandparents, and best friends. This may be because the quick share system recognizes the geo-location of the photos, and since he typically shares photos from locations that are not near his office or home with his close loved ones, these people appear on the share recommendation list. He selects an option to "share with these people" and with a single click, he has shared his vacation photos with his loved ones.

In another example scenario, an individual goes on a vacation and upon her return home, she uploads her photos (either automatically or manually), for example to a cloud-based digital storage service. Since the photos she took were outside of her home/work location, she may receive a recommendation (e.g., via email, short message service ("SMS"), or in an application) to share her recent trip with her parents and best friend. Since the quick share system has already done the work for her, she may simply select "share these photos" and in a single click, her parents and best friend can receive and enjoy her vacation photos.

In another example scenario, a father may be at home taking pictures of his kids. As the father takes the photo, his spouse's name is listed as the suggested person to share with. The father may select an option (e.g., via a user interface) to "always share with my spouse when taking photos at this location" to tell the quick share system that he always wants to share photos with his spouse when he takes photos at home. Now, he never needs to select "share with my spouse" when taking photos at home; the quick share system will show "sharing with your spouse" when taking photos at this location. If the father later decides he is taking a photo he does not want to share with his spouse immediately, he may deselect his spouse's name when taking the photo and in response, the particular photo won't automatically be shared with the spouse.

In another example scenario, a user takes set of photos at a stadium. Based on the photo geo-location and time data, the system performs a search and determines that the photos were taken during a professional soccer match involving a particular team. The system may then also determine (based for example on device location monitoring) that a social networking contact of this user attended this game, or has attended previous games of this team. Based on this information, the system recommends sharing the photos with this social networking contact.

In another example, a user may upload a video to a video sharing site, and tag or describe the video with a phrase that includes the phrase "little league." The system may detect that this user has previously shared photos tagged with "little league" with a particular set of contacts. Based on this info, the system suggests sending a link to the uploaded video to this set of contacts.

As the examples described above and throughout this disclosure illustrate, the quick share system may include a share recommendation engine which is configured to generate one or more share recommendations for an individual/user. The share recommendation engine may be configured to address or determine, for example, at least the following variables or questions: (1) what will be shared, (2) with whom, (3) at what time, (4) where, and (5) how. Put another way, a share recommendation generated by the share recommendation engine may include one or more of: an item (or set of items) of content to be shared (e.g., a photograph/digital image, a document, etc.); one or more persons with whom the item of content may be shared (e.g., a friend, a family member, etc.); and a delivery mechanism or a communication channel by which the item of content may be shared (e.g., by email, by a software or web-based application or service, by mail, by text or Short Message Service ("SMS") message, etc.). The share recommendation may be generated and/or provided at a particular time and place (location), depending on the circumstances.

For example, the share recommendation may be generated by the system at a particular time (e.g., mornings, afternoons, evenings, weekends, or any particular time), or previously generated and provided at a later time, which may be based in part on the individual's share history or behavior. For example, the individual's share history may indicate that the individual frequently shares photos during nighttime hours, and thus a share recommendation may be generated or provided during nighttime hours for the individual. In another embodiment, the share recommendation may be generated by the system based on a time at which the individual typically shares photos and with whom, which may be based at least in part on the individual's sharing history. For example, an individual may typically share photos taken during work hours at a work location (e.g., a photo of a whiteboard after a meeting) with one or more particular co-workers. Then, based on this sharing history, the quick share system may generate a recommendation to share photos taken during work hours at the work location with the one or more particular co-workers.

As another example, the share recommendation may be generated by the share recommendation at a particular location (e.g., at home, at work, at a location of a particular type such as a park, etc.), or previously generated and provided at a particular location, which may be based in part on the individual's share history or behavior. For example, the individual's share history may indicate that the individual frequently shares photos while at a particular location (e.g., at home), and thus a share recommendation to share photos may be generated or provided when the individual is next at the particular location (e.g., when the individual is at home).

Share recommendations may be determined or generated by the quick share system and methods described herein based on a variety of input parameters or signals. In one embodiment, share recommendations may be based at least in part on an individual's activity history (e.g., a list of people the individual shares content with, a list of people who share content with the individual, a list of applications the individual uses to share content, etc.). In one embodiment, share recommendations may be based at least in part on location data. Examples include: a location associated with an item of content itself; a location associated with the individual when the item of content was captured, created, or uploaded; a location associated with the individual when the item of content is to be shared; a location associated with people or services with which the item of content is to be shared; and any other location data which may be relevant to a share recommendation for the item of content and/or the individual.

Thus, a share recommendation may suggest for the individual to share an item of content with a second individual, based on a location that is common to the item of content and the second individual. For example, if a person has an affiliation with a location (e.g., a hometown or current residence), then the quick share system may suggest sharing with that person an item of content associated with the location. Or, in another alternative, a share recommendation may be suggested for the individual to share an item of content with a second individual, based on a history of sharing content with the second individual when the individual is at a certain location. For example, if a person has a history of sharing photos with a sibling when he/she is at home, then the next time the person is at home the quick share system may suggest sharing photos with the sibling.

Share recommendations may be based at least in part on application data, such as data related to one or more applications (e.g., an email application, a social networking application, a text messaging or chat application, a photo gallery and/or camera application, an online or "cloud"-based data storage [e.g., a cloud drive] and/or data sharing application, and/or websites and services) and/or delivery channel mechanisms (e.g., email, text message, physical mail) used by the individual to share content. In one embodiment, application sharing data may also include data about which application is used to share content with particular people or services. For example, an individual may share some photos with family members via email, some other photos with friends via a social networking application/website, and still other photos with other acquaintances via a hosted photo imaging website. The share recommendation may also be based at least in part on information about an application and/or delivery channel to which a potential share recipient has access or permission to access. For example, a share recommendation may suggest sharing an item of content stored in an online cloud drive service with one share recipient who has his/her own account with the cloud drive service, and/or who possibly has access to other items of content stored in the online cloud service.

In another embodiment, share recommendations may be based at least in part on other content data and/or metadata, including tags associated with content (e.g., implicit, explicit, automatic, or manual tags). As used herein, metadata can refer generally to data about an item of content (such as a digital photograph), including but not limited to a geo-location of capture, a time and/or date of capture, a user-supplied textual tag, a file type for the item of content (e.g., JPEG, MOV, and the like), a length (e.g., when the item of content is a video), an image/video resolution, one or more identifiers of who may be in an image or video as determined from automated facial recognition, and/or information regarding audio (e.g., type of music, whose voice, etc.) when the item of content is a video. In one embodiment, an item of content that is a digital photo may include associated metadata in an exchangeable image file format ("Exit") which may include data such as a manufacturer of the device used to capture the digital photo, a device model, orientation, compression, resolution, exposure data, aperture data, focal length data, color data, pixel density data, date and time data, geo-location data, and other similar data which may be automatically generated and/or captured when the digital photo is taken.

In one embodiment, share recommendations may be based at least in part on user feedback data, including votes, likes, comments, and other feedback provided by share recipients. For example, share recipients who frequently "like" photos (or a particular type of photo) shared by a user may tend to be suggested to the user as potential sharees when future sharing opportunities arise. As another example, if a user shares a particular photo with a group of share recipients in the user's network, and the group provides positive feedback on that photo, a suggestion may be made to the user to share the same photo with additional members of the user's network. Feedback data may include, for example, user up-votes, user down-votes, user comments, user likes, user dislikes, and so on. One example of a process for generating share recommendations based on user feedback is illustrated and described with reference to FIG. 3 herein.

Share recommendations may also be based at least in part on event data for one or more events. Events may include, for example, data about past or upcoming events such as sporting events, concerts, theatrical performances, product release events, conventions, holiday events, and the like. Event data may include information about an event, such as the time, date, location, subject or type of the event, participants and/or sponsors of the event, and any other information which may be related to the event. Event data may also include calendar data associated with the individual, such as calendar data stored and/or accessed from a user profile/account associated with the individual. Such calendar data may include information about events which are of a personal nature to the individual, such as birthdays of family and friends, anniversaries, personal milestones, and so forth.

Share recommendations may then be generated based at least in part on such event data. For example, calendar and geo-location data can be used to detect that a photo was likely taken at a particular event, such as a concert or a sporting event. The quick share system may then recommend sharing the photo with other users (e.g., based on other user profile data), including for example (1) other users known to have an affinity for the artist, sports team, etc. associated with the event, (2) other users who also took photos determined to be associated with the same event, and/or (3) other users otherwise known to have attended the event. One example of a process for generating share recommendations based on event data is illustrated and described with reference to FIG. 4 herein.

In one embodiment, share recommendations may be based at least in part on content analysis of a content item. For example, for a photograph or digital image, the quick share system may perform an image analysis to determine or identify individuals (e.g., via a facial recognition algorithm or technique), determine or identify locations/landmarks, and/or determine or identify other items or objects which may be subjects of the photograph (e.g., a piece of art, a sports team which may be identified by a sports team logo on a jersey or billboard, etc.). Thus, share recommendations may be suggested for the individual to share an item of content, such as a photograph, with another individual, based on the content analysis, such as by the quick share system identifying the second individual in the photograph via facial recognition. One example of a process for generating share recommendations based on an image analysis is illustrated and described with reference to FIG. 5 herein.

Share recommendations may also be based at least in part on individual user preferences or settings, which may include for example a list of the individual's top or "favorite" people with whom to share content or "favorite" applications used to share content. Such favorite lists may be created manually by the individual or automatically by the quick share system (e.g., based on the user's share activity and/or behavioral data), or in combination of either or both.

Share recommendations may be provided by the quick share system to the individual/user, for example via one or more user interfaces. For example, share suggestions may be provided via a navigation panel oriented with a left/right/top/bottom/corner, or via a drawer panel overlaid on a digital camera application screen to enable quick sharing from the most contextually-relevant moment possible to maximize the user experience. Examples of user interfaces involving the quick share system are illustrated and described with reference to FIGS. 7, 8, 9A and 9B herein.

In some embodiments, sharing of content may also involve appending content that may be automatically generated based in part on the share suggestion/recommendation. For example, the share suggestion might generate a suggested image caption based on metadata of a photo (e.g., geo-location information, data generated by photo detection such as whether it includes landscape scenery or people). In some embodiments the individual user may manually append additional content such as an audio clip recording or other media/documents to be shared.

Share recommendations may also be based at least in part on the user's organization of content items such as photos. For example, the activity of organizing the content may be a "trigger" that indicates to the quick share system that the user finds the content to be of some importance, and may generate and provide suggestions to share the content with one or more share recipients. In another embodiment, the organizational structure/metadata may also be used as part of the share recommendation process. For example, a folder name for a set of photos may be indicative of a location, subject matter, or other criteria which may be matched to other user profile characteristics and used to suggest sharing the set of photos with other users based on the matching criteria and characteristics. In another embodiment, content items added to a folder or album by a sharing user may trigger the quick share system to generate a recommendation to share the newly added content items with others users with whom the sharing user has previously shared content items in the folder or album.

Although many of the examples and embodiments described herein involve sharing of content between/among/across individual people, these examples may equally be applied to scenarios involving sharing of content between/among/across applications, services, and/or automated or machine-based systems. For example, a share recommendation may suggest sharing a content item from one application or service to a second application or service (e.g., sharing the content item from an email to an online storage service, from one online storage service to another online storage service, from a text message to an application, and so on).

Various aspects of the system will now be described with regard to certain examples and embodiments, which are intended to illustrate but not to limit the disclosure. Nothing in this disclosure is intended to imply that any particular feature or characteristic of the disclosed embodiments is essential to each embodiment.

Examples of Quick Share Systems and Services

FIG. 1 is a general architecture diagram schematically illustrating an example of a quick share system 100 that performs and provides the quick share recommendations services described herein. The quick share system 100 can include any system capable of performing the processes described herein. For example, in the illustrated embodiment of FIG. 1, the quick share system 100 communicates with one or more user computing devices 105 over a network 160. In FIG. 1, the quick share system 100 includes several components such as a share recommendation engine 110 an event analysis module 115, a user profile analysis module 120 and a content analysis module 125. These components may also include further components that may not be depicted in FIG. 1. For example, quick share system 100 can also include one or more servers, e.g., a web server, configured to receive and respond to requests from the user computing devices 105.

The quick share system 100 can also include and/or have access to one or more data stores or data sources including, for example, a user profile/settings/behavioral data store 130, an event data store 135 and a content data store 140. The user profile/settings/behavioral data store 130 may store data related to user profiles, user preferences or settings and user behavioral data including user history and, in particular, sharing history or activity or users interacting with the quick share system 100. For example, the behavioral data may include share history for a user indicating a frequency of what a particular user does or activities the user performs on a user device as well as history of items shared by other users or other individuals via the user computing device 105. The behavioral data and/or user history may also include a history of receiving shared content from other users of the quick share system. In addition, user preferences and/or settings may be stored in the user profile/settings/behavioral data store 130 and may include, for example, device preference(s), application preference(s), preferences for favorite users or individuals with whom to share content, and so on. The user profile/settings/behavioral data store 130 may also store user's social networking account data and/or data which the quick share system 100 may use to access users' social networking accounts via standard APIs provided by existing social networking services, such as log-in account info supplied by the users. The user profile/settings/behavioral data store 130 may also store share recommendations previously generated by the quick share system 100 and/or by a user computing device 105.

The event data store 135 may be used in some embodiments to, for example, store event data for one or more events that may be accessed by the quick share system 100 to identify or determine an event that may match a geo-location and/or time at which an item of content was captured, created, uploaded or shared. Thus, for example, a user might take a photograph via a camera on his or her user computing device 105 (e.g., a smartphone) while at a sporting event at a stadium. The quick share system 100 may access the event data store 135 to access event data for the sporting event at which the user is taking the photograph in order to determine further details about the particular event, such as the date and time of the event, the nature of the event including what sporting teams might be playing at the event and so forth. Such event data may be used, as described herein, to determine one or more users for which the individual may wish to share the photograph based on a common association or affiliation with the event and/or the event data. Thus, for example, the quick share system 100 may determine that the user has taken a photograph at a sporting event or a particular sports team and, in conjunction with the other data sources and processes described herein, determine that a potential sharee is a fan of the sporting team and thus the quick share system 100 may provide a share recommendation to the individual to share the photograph with the identified sharee.

The quick share system 100 may also have access to a content data store 140, which may be configured to store, for example, content and/or data about content associated with users of the quick share system 100. The content may include, for example, photographs, images, digital images, documents (e.g., portable document format ("PDF")), web Universal Resource Locators ("URLs"), and other such content users may store either on their local device, local user computing device and/or in the content data store 140.

The quick share system 100 may include the share recommendation engine 110, which may be configured to, for example, interact with the various data stores described herein to generate one or more share recommendations for a user to share content with one or more potential sharees (e.g., other users of the quick share system 100) based on the type of content to be shared as well as information about the potential sharees and information about the user including the user's history of sharing activity. Thus, for example, the share recommendation engine 110 may provide share recommendations to a user which are contextually related to the user's particular profile and/or history, as well as information about the item of content to be shared such as when and where the item of content was captured or uploaded by the user and so on. The share recommendations engine 110 may also be configured to determine or suggest not only who the content should be shared with but also a means of communication by which the item of content should be shared, such as, for example, email, a particular software application, a printed copy of the item of content and so on. Although the examples described herein focus primarily on sharing of photos and video, it is well understood that the examples can also apply to other media types, including but not limited to documents, multi-media such as music, web URLs, PDFs and so forth.

The quick share system 100 may also include an event analysis module 115, which may be configured to access the event data store 135 in conjunction with the processes described herein. Thus, for example, the event analysis module 115 may access data for an event based on, for example, the date, time, and/or location at which an item of content was captured or uploaded by a user, and use the event data as part of the process of determining potential sharees to provide share recommendations to the user. One example process involving The quick share system 100 may also include user profile analysis module 120, which may be configured to access the user profile/settings/behavioral data store 130. For example, user profile analysis module 120 may access user profile data for a sharing user, as well as for one or more potential sharees who may be associated with the sharing user (e.g., friends, family, acquaintances, social network contacts, etc.) in order to analyze the profile data and determine one or more potential sharees for an item of content to be shared.

The quick share system 100 may also include a content analysis module 125, which may be configured to access content data store 140 to retrieve content data for items of content to be shared by a user. The content analysis module 125 may also be configured to analyze an item of content that is uploaded or captured by the user before storing it in the content data store 140. For example, the content analysis module 125 may be configured to apply one or more facial recognition algorithms or techniques to a photograph in order to identify one or more individuals who may be in the photograph or, in another example, the content analysis module 125 may analyze a photograph to identify one or more locations or landmarks that may be the subject of the photograph as well. The identified individuals and/or locations/landmarks may be stored in the content data store along with the photograph itself and accessed later during the share recommendation processes described herein.

Also shown in FIG. 1, a sample user computing device 105 may include a local share recommendation module 106, a user interface module 107, and a local data store 108. Local share recommendation module 106 may be configured to execute some or all of the processes described herein with respect to generating share recommendations. This may, for example, enable the user computing device 105 to provide share recommendations to the user of the device, even when the user may be not connected to the quick share system 100 over the network 160. This may be the case, for example, if the user computing device 105 does not have wireless access, may not be connected to a cellular network, and so forth.

In one embodiment, a "local" share recommendation generated by the local share recommendation module 106 on the user computing device 105 of a user, may be provided to and stored by the quick share system 100 (e.g., in the user profile/settings/behavioral data store 130), so that the "local" share recommendation may be shared back with or provided to any other user computing device 105 associated with the user. Thus, for example, a user may receive a share recommendation on her smartphone computing device (e.g., generated by the smartphone), and receive the same share recommendation on her tablet computing device via the sharing back from the smartphone to the quick share system, which in turn sends the share recommendation to the user's tablet computing device. Thus share recommendations may be ubiquitous across any and all of a user's various computing devices which are configured to provide, or have access to, the quick share system and features described herein. In one implementation this common or "shared" share recommendation profile for a user may be tracked by the use of web browser cookies to associate one or more user computing devices with the user's account (stored, by example, in the user profile/settings/behavioral data 130).

The user interface module 107 may be configured to, for example, generate one or more user interfaces, such as the user interfaces described herein, to provide the share recommendations to the user of the device, wherein the share recommendations may be generated either by the quick share system 100 and provided to the user computing device 105, or they may be generated on the user computing device 105 via the local share recommendations module 106.

User computing device 105 may also include a local data store 108, which may be configured to store some or all of the data used to generate the share recommendations as described herein. For example, the local data store 108 may store local or cached copies of content items, such as photographs and/or documents, which the user may wish to share with other individuals but may or may not have uploaded to the quick share system 100.

Examples of Methods Performed by a Quick Share System

FIGS. 2, 3, 4, 5, and 6 are logical flow diagrams for various embodiments of share recommendation routines. In some implementations, the routines are performed by embodiments of the quick share system 100 described with reference to FIG. 1 or by one of its components, such as the share recommendation engine 110, the event analysis module 115, the user profile analysis module 120, and/or the content analysis module 125. The example scenarios are intended to illustrate, but not to limit, various aspects of these systems and/or services. In one embodiment, the routines can be dynamic, with some procedures omitted and others added. In one example, multiple instances of the routines may occur concurrently, for different quick share systems or services FIG. 2A schematically illustrates a logical flow diagram of an embodiment of a process 200A for providing share recommendations to a user for an item of content, involving a quick share system such as the quick share system 100 of FIG. 1. The process 200A may be executed, for example, by the share recommendation engine 110, the event analysis module 115, the user profile analysis module 120, and/or the content analysis module 125 of the quick share system 100 of FIG. 1. For ease of illustration, the process 200A will be described as being executed by the quick share system 100.

At block 205, the quick share system 100 accesses a user profile data for a sharing, or first, user. For example, the user profile data of the sharing user may be accessed from the user profile/settings/behavioral data 130 and may include information about the user including the user's share history. At block 210, the quick share system 100 accesses the content data for a digital media item of the sharing user. For example, the content data may be accessed from the content data store 140. In one embodiment, the content data may be uploaded or provided by the user with the digital media item. The digital media item may comprise, for example, text, an image, a document scan, an audio recording, or a video recording.

At block 215, the quick share system 100 may optionally access profiles of potential sharee users associated with the sharing user. For example, based on the user profile data of the sharing user, the quick share system 100 may identify one or more potential sharee users who are friends, family, acquaintances and other individuals that may be associated with the sharing user, for example, via a contacts list, a list of social media contacts or connections and the like. In some embodiments, the quick share system 100 may generate share recommendations without accessing profile data associated with potential sharee users or share recipients.

At block 220, the quick share system 100 analyzes the content data, the user profile data of the sharing user, and (if accessed) the user profile data of potential sharee users to identify a share potential of the digital media item with respect to the potential sharee users associated with the sharing user. For example, the content data/metadata may indicate a location and/or time at which the digital media item was initially created or captured by the sharing user. Based on this information, the quick share system 100 may determine that the digital media item has a greater share potential with potential sharee users who share an association with the date and time and/or location of the content. For example, if a photograph was taken at the sharing user's home, then the quick share system 100 may determine, based on profiles of potential sharee users, that there is a greater share potential of the photograph if users share the same home as the sharing user, such as close family members like a spouse, parents and children.

In another example, the quick share system 100 may determine the share potential with respect to the potential sharee users based only on the content data/metadata and the user profile data of the sharing user. For example, the user profile data of the sharing user may include a history of past sharing activity, including one or more past share recipients, and based on this history and the content data of the digital media item the quick share system 100 may determine a share potential without accessing or analyzing the user profile data of potential sharees. One example of this alternative process is illustrated and described with respect to the process 200B of FIG. 2B.

At block 225, the quick share system 100 determines one or more share recommendations for sharing a digital media item with at least some of the potential sharees based on the share potential identified at block 220.

At block 230, the quick share system 100 provides share recommendations to the sharing user. For example, in one embodiment, the share recommendations may be provided to the sharing user via a user interface, such as one of the user interfaces illustrated in FIGS. 7, 8, 9A and 9B herein, that may be generated by quick share system 100 and/or the user interface module 107 on the user's computing device 105.

Figure 2A:
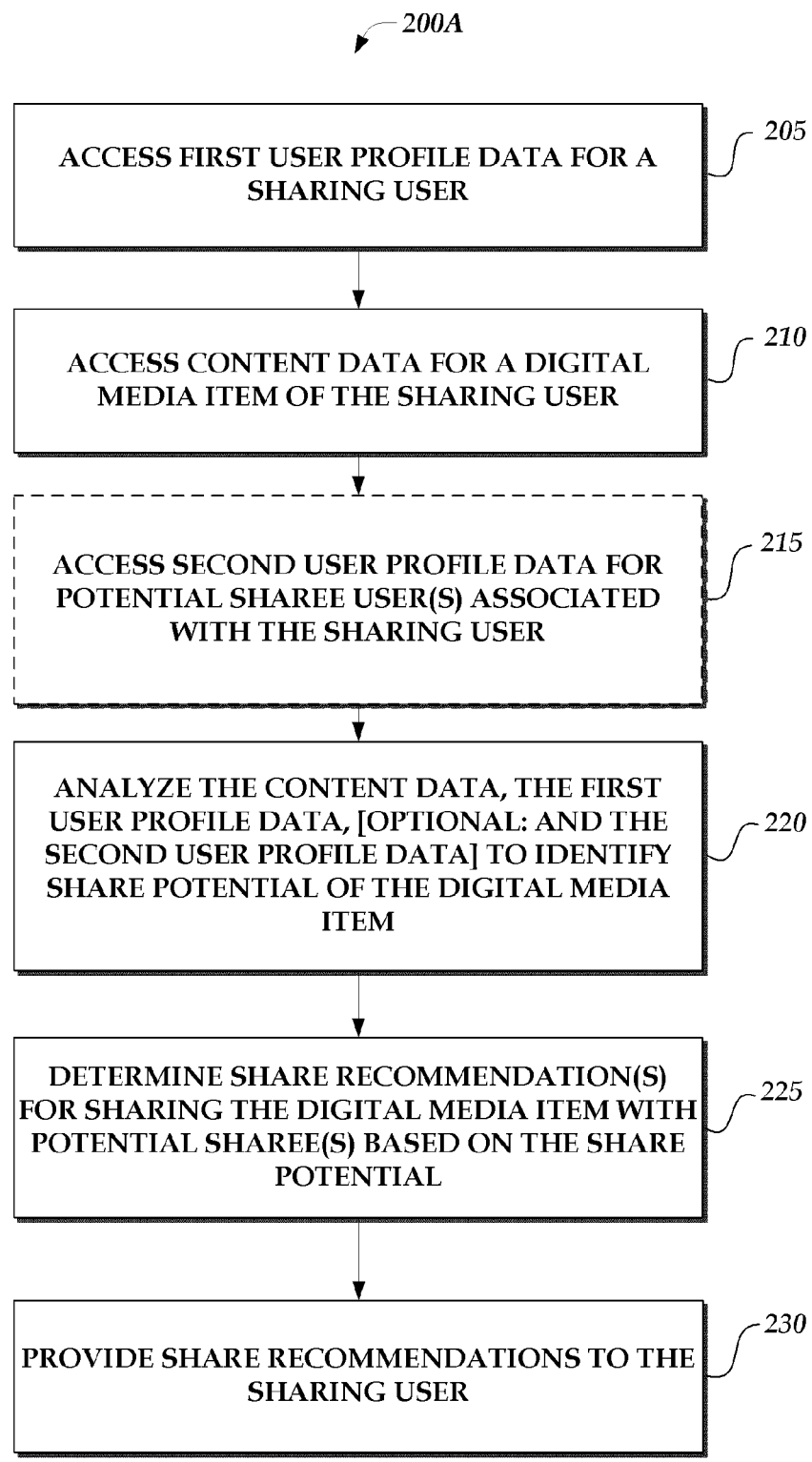
FIG. 2A is a logical flow diagram of an embodiment of a process for providing share recommendations to a user for an item of content, involving a quick share system such as the quick share system of FIG. 1.
Figure 2B:
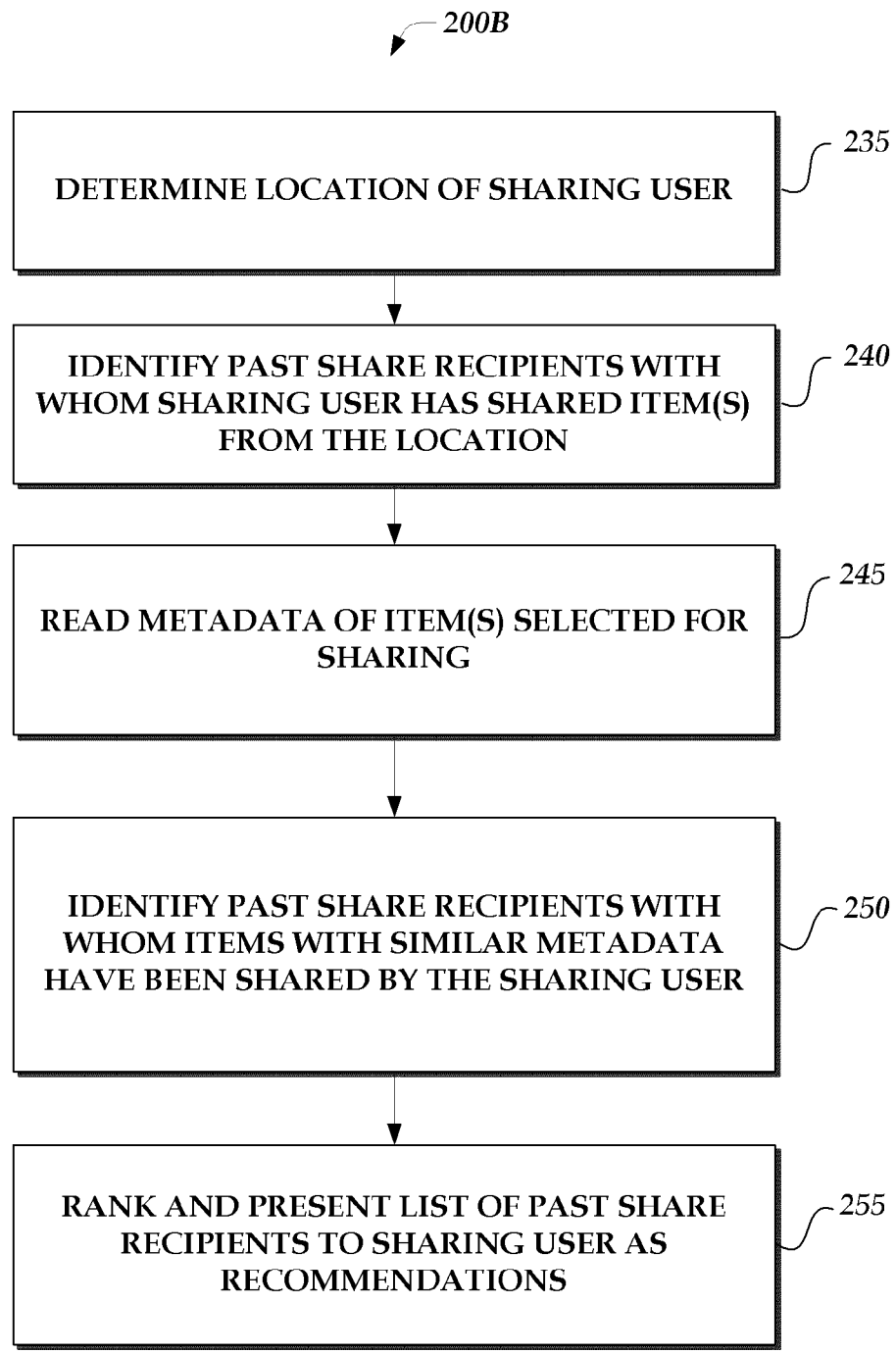
FIG. 2B is a logical flow diagram of an embodiment of a process for providing share recommendations to a user for an item of content, involving a quick share system such as the quick share system of FIG. 1.

FIG. 2B schematically illustrates a logical flow diagram of an embodiment of another process 200B for providing share recommendations to a user for an item of content, involving a quick share system such as the quick share system 100 of FIG. 1. The process 200B may be executed, for example, by the share recommendation engine 110, the event analysis module 115, the user profile analysis module 120, and/or the content analysis module 125 of the quick share system 100 of FIG. 1. For ease of illustration, the process 200B will be described as being executed by the quick share system 100. The process 200B may be executed separately or in combination with the process 200A as described with reference to FIG. 2A.

At block 235, the quick share system 100 determines a location of a sharing user. The location may be determined, for example, based on geo-location data accessed or received from a computing device of the sharing user and/or based on user profile data for the sharing user. As an example, the location may be determined to be the sharing user's work office based on a matching of geo-location data of the sharing user's device to user profile data including the sharing user's employer information.

At block 240, the quick share system 100 identifies past share recipients with whom the sharing user has shared items from the determined location. The past share recipients may be identified, for example, based on a sharing history associated with the sharing user which may be accessed from the user profile/settings/behavioral data 130. The sharing history may comprise data indicating one or more previously shared items, with whom the previously shared items were shared, when the items were shared and by what means (e.g., an application, an email, a text message, etc.), and so on. As part of this process the quick share system 100 may consider how frequently the user has shared with a given recipient from the current sharing location. Continuing the example introduced at block 235, the past share recipients may be identified as (in no particular order) one or more co-workers of the sharing user, a friend of the sharing user, and/or the sharing user's spouse.

At block 245, the quick share system 100 reads metadata of one or more items selected for sharing. The items may be selected for sharing either manually by the sharing user or, in some embodiments, automatically by the quick share system 100, such as in response to another action by the user like taking a digital photograph or video. The metadata may be accessed from, for example, the content data store 140, or received from the user computing device 105 of the sharing user. Continuing the example introduced at block 235, the one or more items selected for sharing may include a photograph of a whiteboard taken after a team meeting. The metadata for the one or more items may include a date and time the whiteboard photo was captured, and a location at which the whiteboard photo was taken.

At block 250, the quick share system 100 identifies past share recipients with whom items with similar metadata have been shared by the sharing user. The past share recipients may be identified, for example, based on the sharing history associated with the sharing user accessed from the user profile/settings/behavioral data 130. In one embodiment, the past share recipients identified at block 250 may be selected from the past share recipients identified at block 240 (e.g., a subset, including in some instances the entire set). Continuing the example introduced at block 235, at block 250 the quick share system 100 may identify the past share recipients as co-workers with whom the sharing user has previously shared photos at work based on similar time and location metadata.

At block 255, the quick share system 100 ranks and presents a list of share recipients including at least some of the past share recipients to the sharing user as recommendations. The list of share recipients may include some (or all) of the past share recipients identified at block 240, the past share recipients indented at block 250, and/or other share recipients identified by other processes described herein (e.g., based on user feedback, event data, facial recognition, etc.). The quick share system 100 may rank the list of share recipients, for example based on some or all of: a likelihood of the items to be shared being relevant or of interest to the respective share recipients; a determined share potential for an item to be shared with respect to a potential share recipient (e.g., as determined by the process 200A described herein); a degree of matching between attributes associated with the share recipients and the metadata associated with the items to be shared (e.g., the greater the number of matching attributes, the higher the rank will be for the particular share recipient); and/or other criteria which may be used to generate an objective measurement or assessment for each share recipient that may be ranked or weighted for ranking. The list of share recipients may then be presented or provided to the sharing user, for example via one of the user interfaces described herein (e.g., the user interfaces illustrated and described with reference to FIGS. 7, 8, 9A and 9B).

Figure 3:
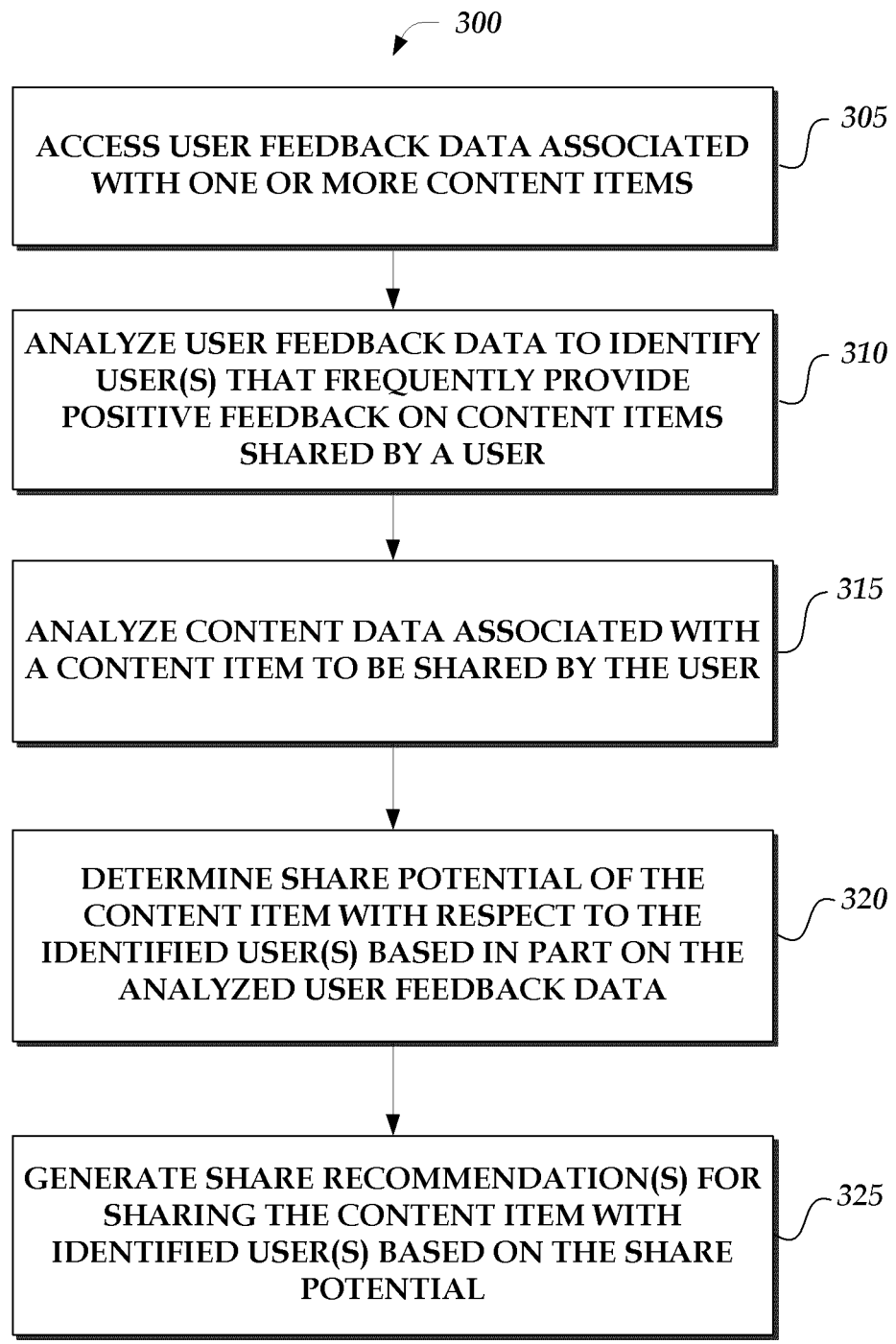
FIG. 3 is a logical flow diagram of an embodiment of a process for generating share recommendations for an item of content based in part on user feedback data, involving a quick share system such as the quick share system of FIG. 1.

FIG. 3 schematically illustrates a logical flow diagram of an embodiment of a process 300 for generating share recommendations for an item of content based in part on user feedback data, involving a quick share system such as the quick share system 100 of FIG. 1. The process 300 may be executed, for example, by the share recommendation engine 110, the event analysis module 115, the user profile analysis module 120, and/or the content analysis module 125 of the quick share system 100 of FIG. 1. For ease of illustration, the process 300 will be described as being executed by the quick share system 100.

At block 305, the quick share system 100 accesses user feedback data associated with one or more content items. The user feedback data may be accessed from, for example, a content data store 140, which may be configured to store such feedback data along with the one or more content items in the content data store. User feedback data may include, for example, data about users who have "liked" an item of content, voted on an item of content, commented on an item of content, or provided some other form of user feedback that may be associated with the item of content.

At block 310, the quick share system 100 analyzes the user feedback data to identify one or more users that frequently provide positive feedback on content items shared by a user. For example, share recipients who frequently "like" or comment on content items shared by the user may be identified as part of this process to develop an initial list of potential share recipients.

At block 315, the quick share system may analyze content data associated with the content item to be shared by the user. Content data may be associated with the content item to be shared, and/or may be accessed from the content data store 140. The content data may be compared to, for example, other content data associated with items previously shared by the user to identify common characteristics or attributes.

At block 320, the quick share system determines the share potential of the content item with respect to the identified users based in part on the analyzed user feedback data. The share potential of the content item with respect to the potential share recipients, who previously provided positive feedback on content items shared by the user, may be relatively high due in part to the common characteristics or attributes. For example, the share potential for a new photograph of the user's infant may be high among family members who previously "liked" other photographs of the user's infant. As another example, the share potential for the same new photograph may be low among friends or acquaintances who did not "like" or provide user feedback for the other photographs of the user's infant.

At block 325, the quick share system generates share recommendations for sharing the content item with identified users based on the share potential. Thus, continuing the example above, the quick share system may suggest sharing the new photograph with family members identified at block 310 as potential share recipients.

The process 300 may also be performed in combination with the other processes described herein. Thus for example, the share recommendations generated at block 430 may also include other features of share recommendations including a recommended communication channel for sharing the content item for each of the share recipients.

Figure 4:
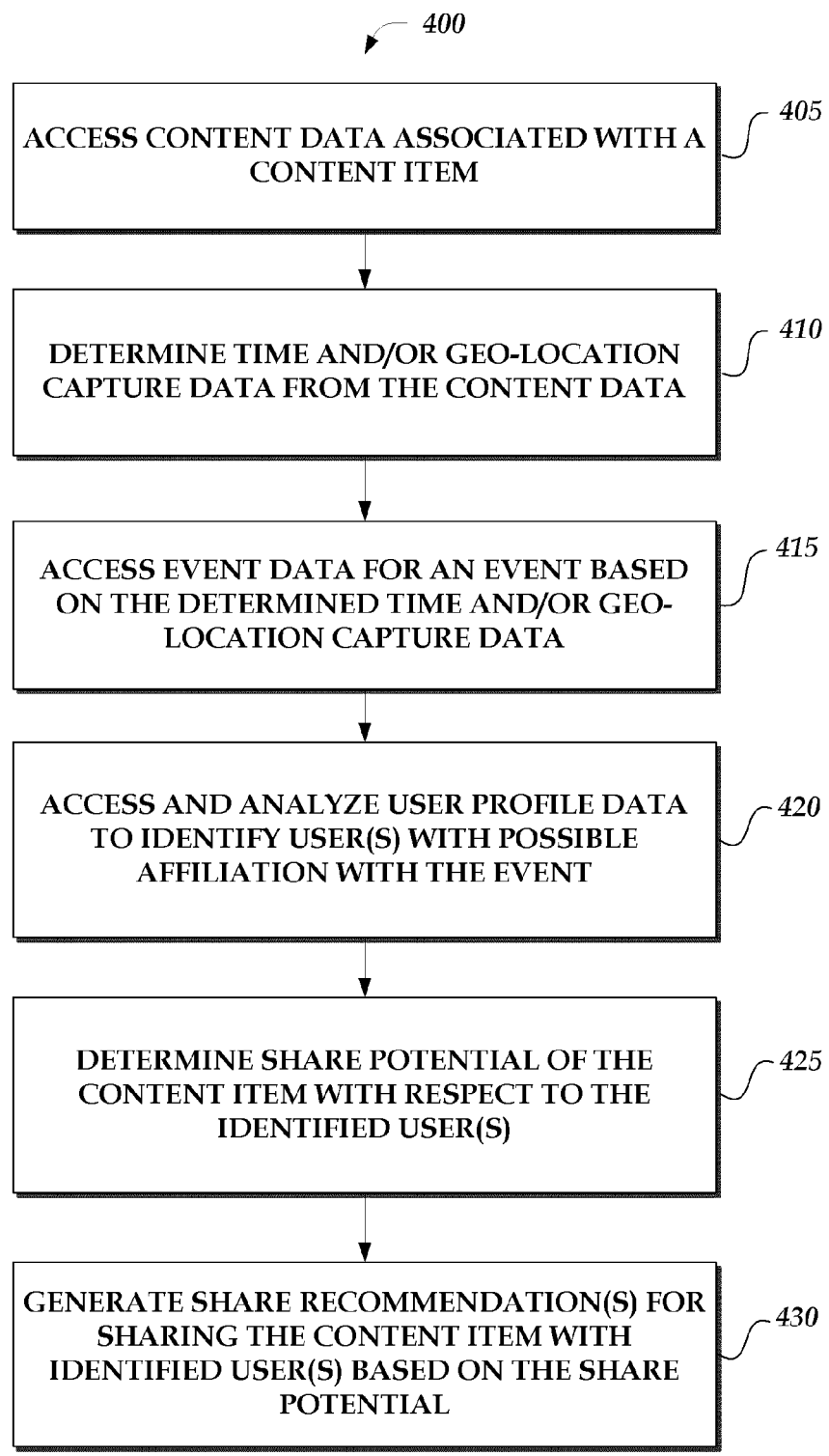
FIG. 4 is a logical flow diagram of an embodiment of a process for generating share recommendations based at least in part event data which may be related to a content item to be shared, involving a quick share system such as the quick share system of FIG. 1. The process 400 may be executed, for example, by the share recommendation engine 110, the event analysis module 115, the user profile analysis module 120, and/or the content analysis module 125 of the quick share system 100 of FIG. 1. For ease of illustration, the process 400 will be described as being executed by the quick share system 100.

FIG. 4 schematically illustrates a logical flow diagram of an embodiment of a process 400 for generating share recommendations based at least in part event data which may be related to a content item to be shared, involving a quick share system such as the quick share system 100 of FIG. 1.

At block 405, the quick share system accesses content data associated with a content item. The content data may be accessed, for example, from the content data store 140. In one embodiment, the content data is determined or extracted from the content item itself.

At block 410, the quick share system 100 determines the time, date and/or geo-location creation or capture data from the content data associated with the item. The time, date and/or geo-location data may be determined from metadata associated with the item which may be automatically generated when the item was created or captured, or manually provided by the user/owner of the content item.

At block 415, the quick share system 100, for example via the event analysis module 115, accesses event data, for example from the event data store 135, for an event based on the determined time and/or geo-location capture data. The event data may include, for example, information about the particular event that matches the determined time and/or geo-location capture data. For example, a photograph taken at a certain time (e.g., 7:05 pm) and location (e.g., a baseball stadium) may be mapped to a sporting event (e.g., a baseball game).

At block 420, the quick share system 100 may access and analyze user profile data to identify users with possible affiliation with the event. For example, the user profile data may be accessed from the user profile/settings/behavioral data 130 and may include information such as user preferences, likes and hobbies/interests which may indicate, for example, particular sporting events, sports teams, musicians and the like that may be of interest to the users to be identified.

At block 425, the quick share system 100 determines the share potential of the content item with respect to the identified users. The share potential of the content item with respect to the identified users may be higher when the identified users have a characteristic, attribute, or interest in common with or related to the event data associated with the content item. For example, the share potential for a photograph captured at a baseball game may be high among friends who are fans of baseball and/or baseball teams playing in the game.

At block 430, the quick share system 100 generates share recommendations for sharing the content item with the identified users based on the share potential. Thus, continuing the example above, the quick share system may suggest sharing the new photograph with family members identified at block 310 as potential share recipients.

The process 400 may also be performed in combination with the other processes described herein. Thus for example, the share recommendations generated at block 430 may also include other features of share recommendations including a recommended communication channel for sharing the content item for each of the share recipients.

Figure 5:
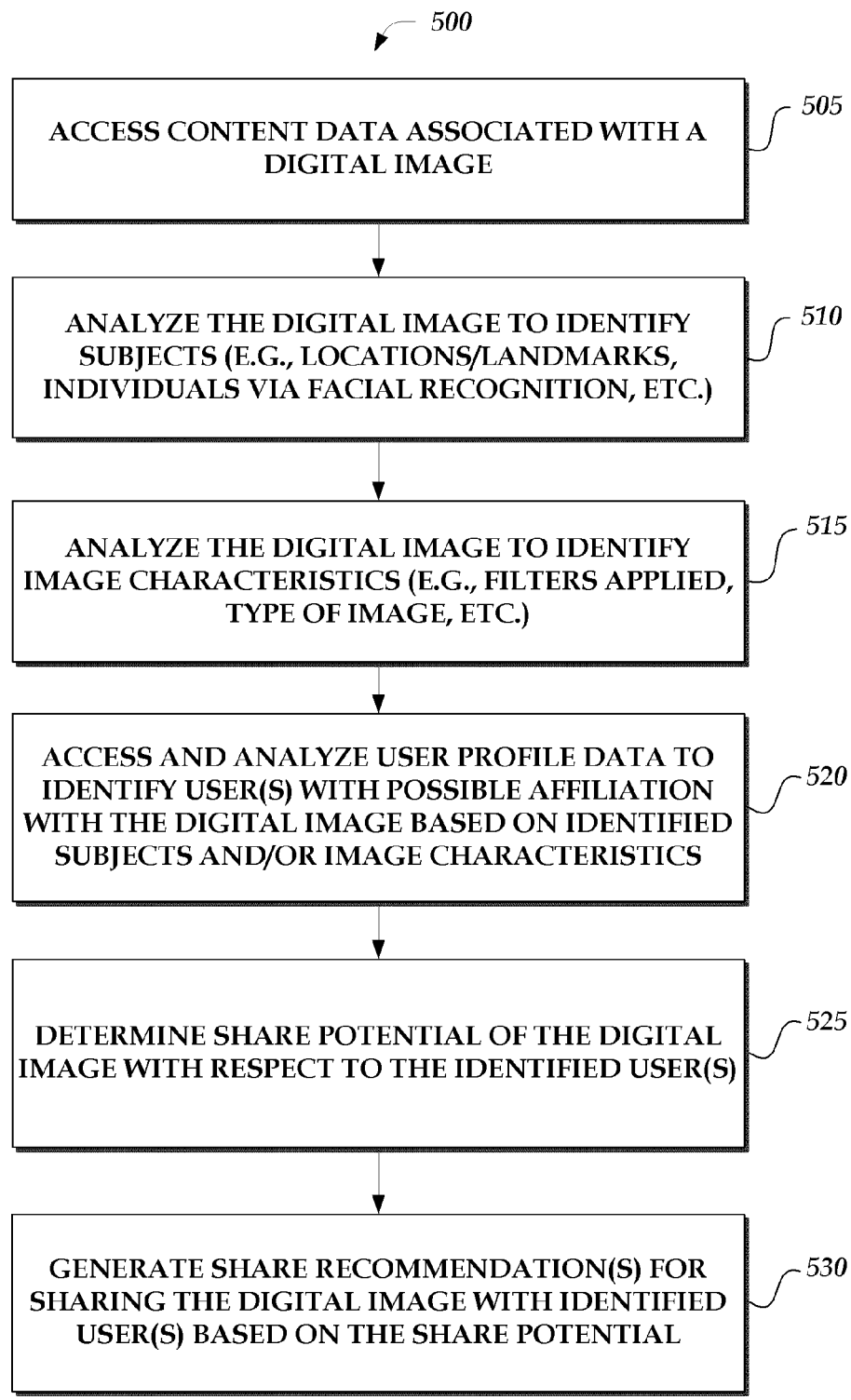
FIG. 5 is a logical flow diagram of an embodiment of a process for generating share recommendations based at least in part on an image analysis of a content item, such as a photograph or digital image, involving a quick share system such as the quick share system of FIG. 1.

FIG. 5 schematically illustrates a logical full diagram of an embodiment for process 500 for generating share recommendations based at least in part on an image analysis of a content item, such as a photograph or digital image, involving a quick share system such as the quick share system 100 of FIG. 1. The process 500 may be executed, for example, by the share recommendation engine 110, the event analysis module 115, the user profile analysis module 120, and/or the content analysis module 125 of the quick share system 100 of FIG. 1. For ease of illustration, the process 500 will be described as being executed by the quick share system 100.

At block 505, the quick share system 100 accesses content data associated with a digital image. The content data may be accessed, for example, from the content data store 140. In one embodiment, the content data is determined or extracted from the digital image, for example as metadata content associated with the digital image.

At block 510, the quick share system 100 analyzes the digital image to identify subjects within the digital image. For example, the digital image may be analyzed to identify one or more locations/landmarks and/or one or more individuals, for example via facial recognition and similar techniques.

At block 515, the quick share system 100 analyzes the digital image to identify image characteristics, for example filters which may be applied to the image, a type associated with the image, and other attributes that may be associated with the image.

At block 520, the quick share system 100 accesses and analyzes user profile data to identify users with possible affiliation with the digital image based on the identified subjects from block 510 and/or image characteristics from block 515. The user profile data may be accessed, for example, from the user profile/settings/behavioral data store 130. Such user profile data may be analyzed in order to determine or identify one or more potential share recipients who may have an interest, a characteristic, or a profile demographic (e.g., a location) which may be in common with the identified subjects and/or image characteristics in the digital image.

At block 525, the quick share system 100 determines a share potential of the digital image with respect to the identified users. The share potential of the content item with respect to the identified users may be higher when the identified users have a characteristic, attribute, or interest in common with or related to the content data associated with the digital image. For example, the share potential for a photograph including a certain individual may be high for that individual, since he/she is in the photograph. In another example, the share potential for a photograph of a certain location or landmark may be high for an identified user who has an interest in the landmark, visits the location frequently or perhaps lives there, or is somehow otherwise affiliated with the subject matter of the photograph via a common attribute, interest, or characteristic.

At block 530, the quick share system 100 generates share recommendations for sharing a digital image with identified users based on the share potential. Thus, continuing the example above, the quick share system may suggest sharing the digital image with users identified at block 520 as potential share recipients.

The process 500 may also be performed in combination with the other processes described herein. Thus for example, the share recommendations generated at block 530 may also include other features of share recommendations including a recommended communication channel for sharing the content item for each of the share recipients.

Figure 6:
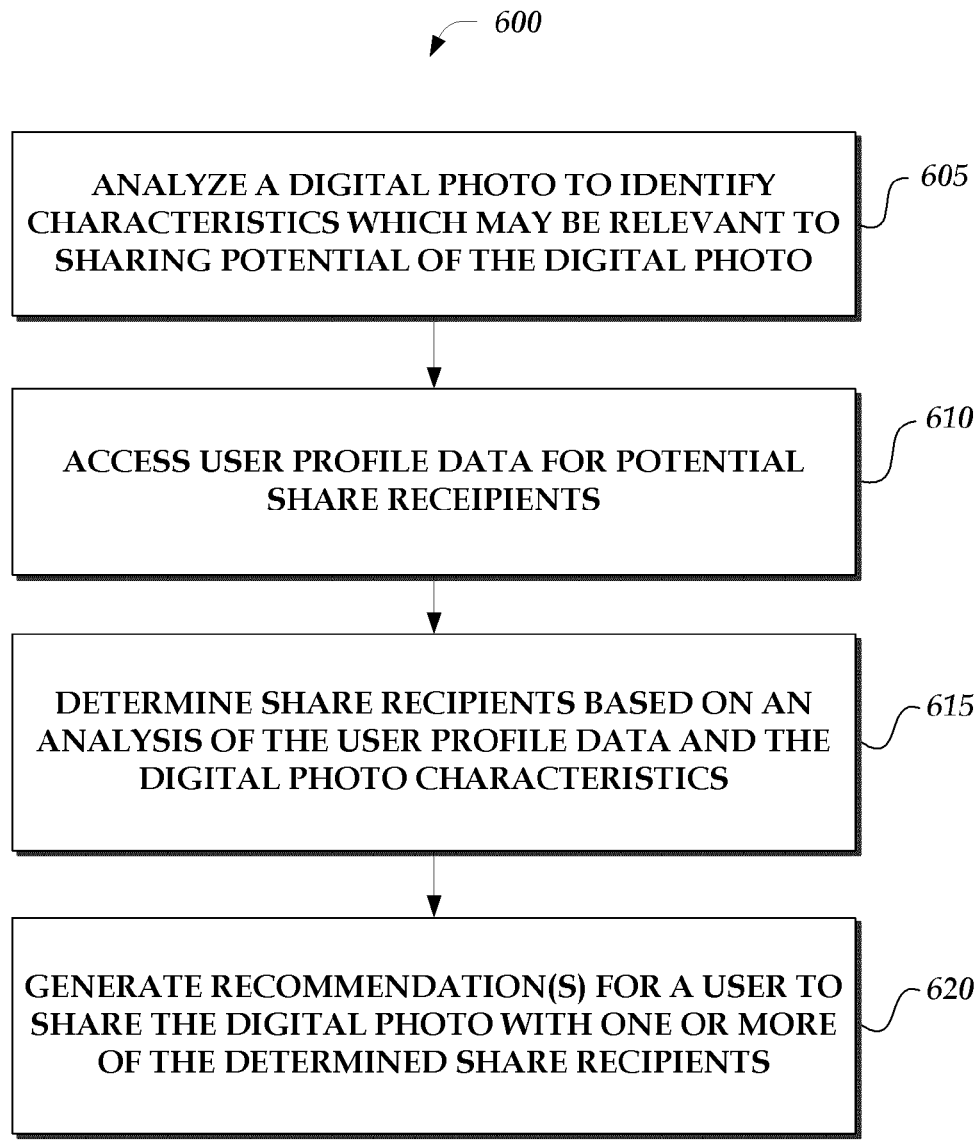
FIG. 6 is a logical flow diagram of an embodiment of a process for generating recommendations for a user to share a digital photo with one or more share recipients, involving a quick share system such as the quick share system of FIG. 1.

FIG. 6 schematically illustrates a logical flow diagram of an embodiment of a process 600 for generating recommendations for a user to share a digital photo with one or more share recipients, involving a quick share system such as the quick share system 100 of FIG. 1. The process 600 may be executed, for example, by the share recommendation engine 110, the event analysis module 115, the user profile analysis module 120, and/or the content analysis module 125 of the quick share system 100 of FIG. 1. For ease of illustration, the process 600 will be described as being executed by the quick share system 100.

At block 605, the quick share system 100 analyzes a digital photo to identify characteristics which may be relevant to sharing potential of the digital photo. For example, the digital photo may be analyzed to identify one or more individuals in the photo, one or more locations and/or landmarks in the photo and other characteristics which may be relevant to the share potential of the photo. For example, the digital photo may also be analyzed to identify events that may be occurring in the photograph, such as a sporting event based on event data that may be accessed from the event data store 135.

At block 610, the quick share system 100 may access user profile data for potential share recipients. The user profile data may be accessed, for example, from the user profile/settings/behavioral data store 130. The potential share recipients may be initially determined or identified based on an individual's user profile data which may indicate for example one or more contacts or connections (e.g., friends, family, acquaintances, etc.).

At block 615, the quick share system 100 determines one or more share recipients based on an analysis of the user profile data and the digital photo characteristics. For example, the user profile data may be analyzed in order to determine or identify one or more potential share recipients who may have an interest, a characteristic, or a profile demographic (e.g., a location) which may be in common with the identified subjects and/or image characteristics in the digital photo. In one embodiment, the quick share system 100 may detect that a face of a contact associated with the user, or of a person who has an established connection with the contact, appears in the digital photograph.

At block 620, the quick share system 100 generates recommendations for a user to share the digital photo with one or more of the determined share recipients. Thus, continuing the example above, the quick share system 100 may suggest sharing the digital photo with users identified at block 615 as potential share recipients. The share recommendations generated at block 620 may also include other features of share recommendations including a recommended communication channel for sharing the content item for each of the share recipients.

Example User Interfaces

FIGS. 7, 8, 9A and 9B illustrate sample user interfaces that may be generated by or used with the quick share system 100, providing various user interface controls to enable functionality as described in this disclosure. In various embodiments, each of the user interfaces shown in FIGS. 7, 8, 9A and 9B may be presented as a web page, as a mobile application display, as a stand-alone application display, as an email message, as a text message (e.g., a short message service ("SMS") or a multimedia messaging service ("MIMS") message) or by other communication means. In other embodiments, analogous interfaces may be presented using audio or other forms of communication. In an embodiment, the interfaces shown in FIGS. 7, 8, 9A and 9B are configured to be interactive and respond to various user interactions. Such user interactions may include clicks with a mouse, typing with a keyboard, touches and/or gestures on a touch screen, voice commands, and/or the like. For example, in one embodiment a user may be able to share a content item by clicking and dragging (e.g. by a mouse or by touch) the content item onto a visual representation of the person with whom the content item should be shared (e.g., a photo may be dragged onto the person's face).

Figure 7:
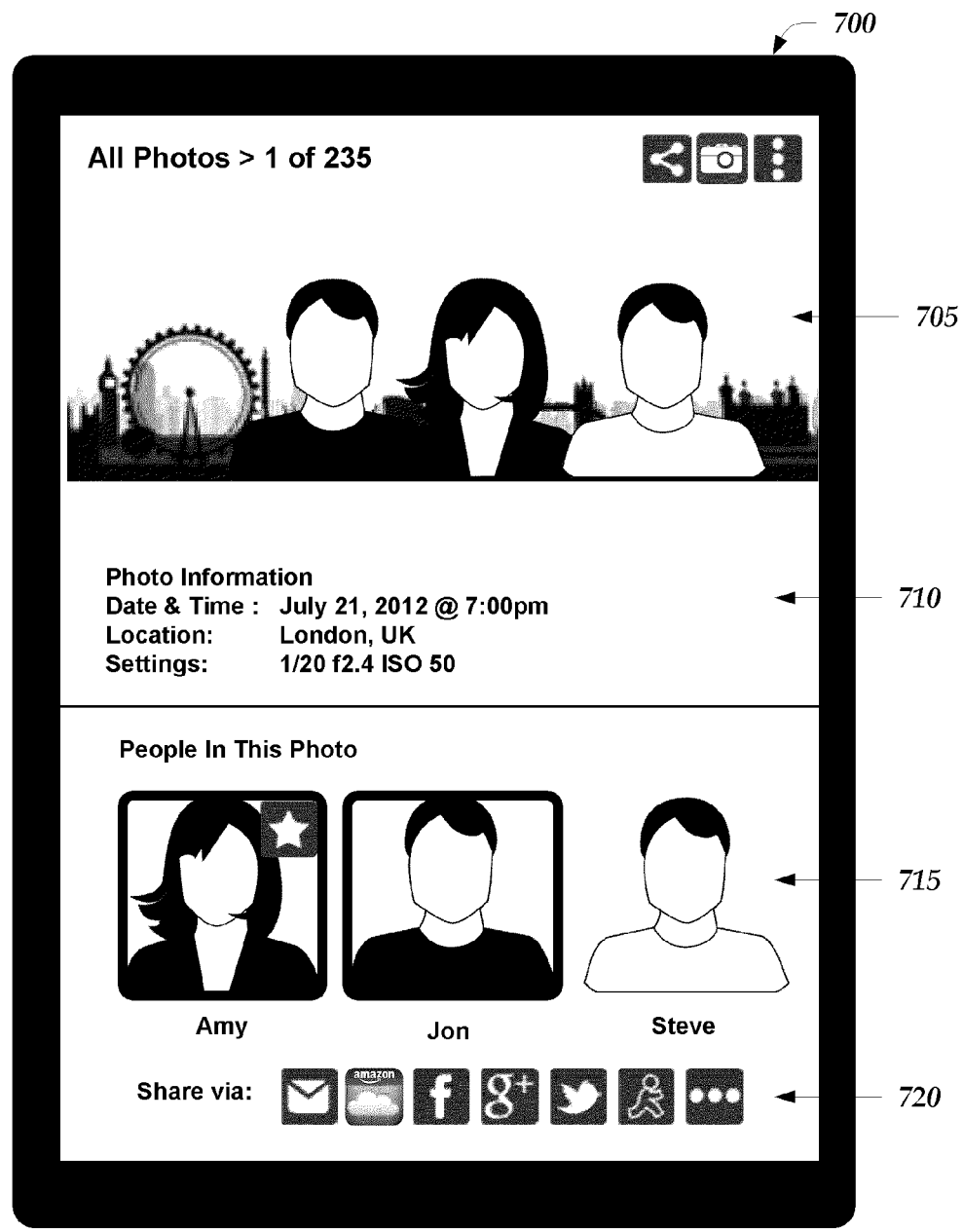
FIG. 7 is a pictorial diagram of an example user interface that illustrates share recommendations provided to a user, as generated by a quick share system, such as the quick share system of FIG. 1.

FIG. 7 illustrates an example user interface 700 that presents share recommendations, involving a quick share system such as the quick share system 100 of FIG. 1. The example user interface 700 shows a camera application displaying a photo 705, photo information 710, people in the photo 715, and one or more share icons 720. In this example, the photo 705 is a photograph (or partial photograph) of the London city skyline. Photo information 710 may include, for example as illustrated, a date and time the photo was taken, a location where the photo was taken, and one or more photo settings which may be associated with the photo (e.g., camera settings such as aperture, focal length, ISO; other camera information typically captured by a digital camera application or device may also be included and saved with the photo as content metadata).

The user interface 700 also shows people 715 ("Amy," "Jon", and "Steve") who have been identified as appearing in the photo 705. For example, the people 715 may have been identified by the quick share system 100 via a facial recognition algorithm or technique and matched to individuals associated with the user or owner of the photo (e.g., via the user's contacts, social network connections, etc.). Since the people 715 appear in the photo 705, the quick share system 100 may have determined that these people 715 would be probable candidates for sharing the photo (e.g., the share potential may be relatively higher for people actually in the photo). Thus, the user may select one or more of the people 715, for example by clicking or touching on each desired share recipient's contact picture. Here, "Amy" and "Jon" have been selected as share recipients for the user to share the photo with (as indicated, for example, by the black border around Amy and Jon's contact pictures). Further, the user interface 700 may provide a visual indicator of "favorite" share recipients, as indicated for example by the star icon in the upper right corner of Amy's contact picture. This may be visualized in many different ways (e.g., different icons, different position, color indicators instead of or in combination with icons, etc.). In some embodiments these "favorite" share recipients may be automatically selected for the user when the quick share user interface/panel is displayed.

The user interface 700 also displays a number of share icons 720 to illustrate one example of how the user may be presented with options to select one or more communication channels by which the photo is to be shared. For example, a selection of popular applications and/or services may be included, such as email or text message, online storage (e.g., Amazon Cloud Drive™), social network services (e.g., Facebook™, Google Plus™, Twitter™, instant messenger/chat (e.g., AOL™), or other share options which may be available to the user (e.g., send by mail which may link the user to a photo printing and mailing service) as indicated by the final icon at the right. Other variations on user interface 700 may be possible including more or less information displayed, such as reasons for why the share recommendations are being provided, additional content which may be appended to the photo when it is shared (e.g., a text caption), and so on. Variations on presentation and display may also be possible, including for example displaying additional or fewer share recommendations, displaying the share recommendations at a different screen justification/orientation, displaying the share recommendations in a popover user interface element or panel, and so on. In another embodiment, the user interface 700 may also display, or provide an option to view, an explanation of why a particular share recipient is being recommended. For example, under each recommended recipient the user interface 700 may display a link or button labeled "Why?" When the user selects the "Why?" option, the user might see an explanation such as "Because this person has liked other photos you posted of London," or "Because this person was in London at the same time."

Figure 8:
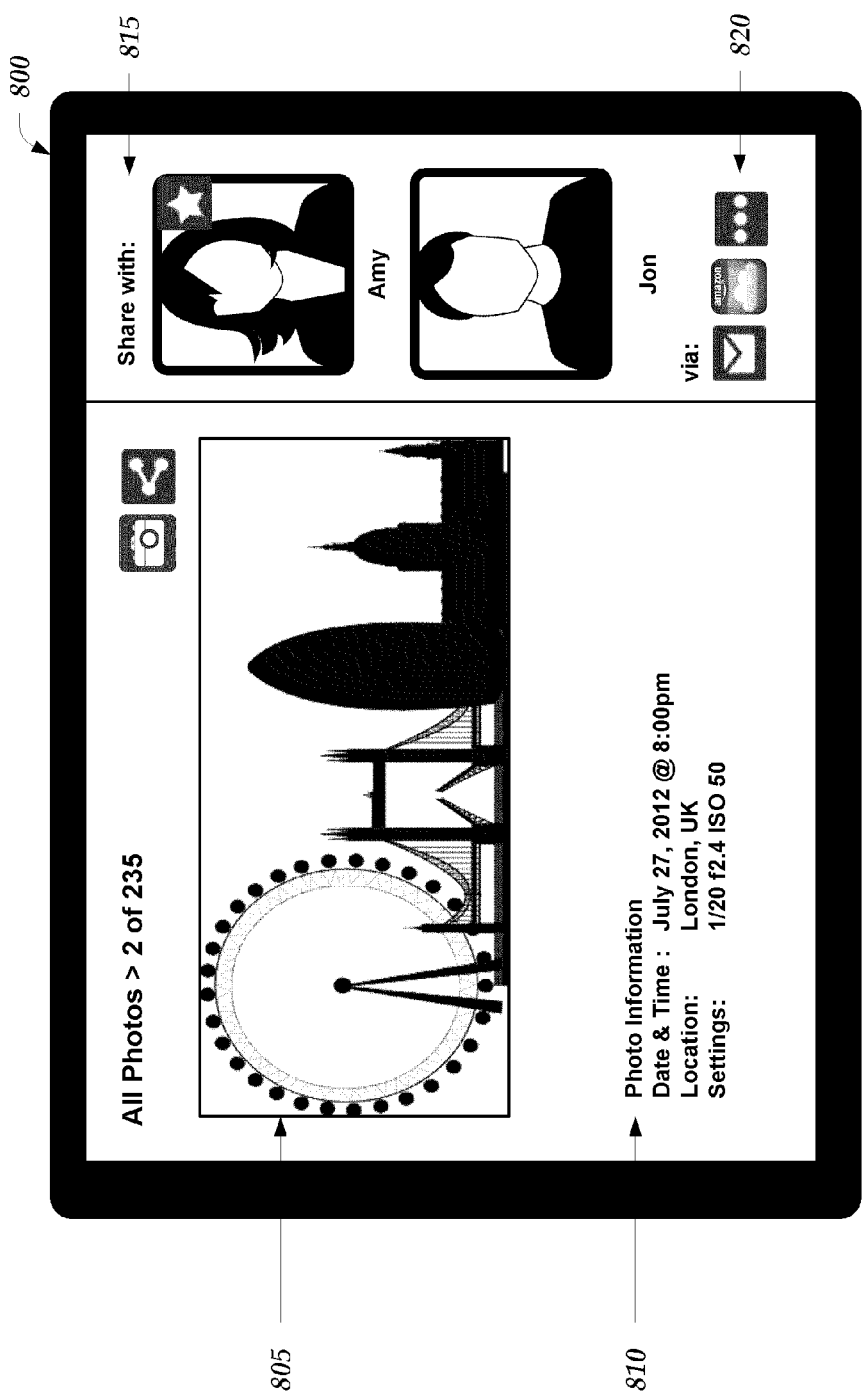
FIG. 8 is a pictorial diagram of another example user interface that illustrates share recommendations provided to a user, as generated by a quick share system, such as the quick share system of FIG. 1.

FIG. 8 illustrates another example user interface 800 that presents share recommendations, involving a quick share system such as the quick share system 100 of FIG. 1. The example user interface 800 shows a camera application displaying a photo 805, photo information 810, people in the photo 815, and one or more share icons 820. In this example, the photo 805 is a photograph of the London city skyline. Photo information 810 may include, for example as illustrated, a date and time the photo was taken, a location where the photo was taken, and one or more photo settings which may be associated with the photo (e.g., camera settings such as aperture, focal length, ISO; other camera information typically captured by a digital camera application or device may also be included and saved with the photo as content metadata).

The user interface 800 also shows "share with" people 815 who have been identified as potential sharees or share recipients. For example, similar to FIG. 7, the people 815 may have been identified by the quick share system 100 via a facial recognition algorithm or technique and matched to individuals associated with the user or owner of the photo (e.g., via the user's contacts, social network connections, etc.). However, other variations on how these share recommendations are generated by the quick share system 100 are possible. For example, the "share with" people 815 may be identified as share recipients who may be interested in the photo due to a common or shared attribute in common with the photo. For example, Amy might live in London, travel to London often, have a personal hobby/interest in London (e.g., an Anglophile), and thus she may be identified by the quick share system 100 as a potential share recipient regardless of whether she appears in the photo.

As another example, Jon may be identified as a share recipient based on event data related to the photo. For example, based on the date/time and location of the photo, the quick share system 100 may determine, for example via the event analysis module 115 and the content analysis module 125, that the photo was taken during the 2012 Olympics in London, or may be more specifically the opening ceremony of the 2012 Olympics in London. The quick share system 100 further determine, for example via the user profile analysis module 120, that the user's contact Jon has an interest in the Olympics (e.g., based on user profile data for the user and/or for Jon). Based on this interest, the quick share system 100 may, for example via the share recommendation engine 110, generate a recommendation to share this photo with Jon apparently because he might be personally interested in the photo. Similar to the recommendation for Amy, Jon may be identified by the quick share system 100 as a potential share recipient regardless of whether he appears in the photo.

The user interface 800 also displays a number of share icons 820 which the user may select as a communication channel or delivery mechanism by which the photo is to be shared. Other variations on user interface 800 may be possible including more or less information displayed, such as reasons for why the share recommendations are being provided (e.g., based on location, based on event data, based on interest, etc.), additional content which may be appended to the photo when it is shared (e.g., a text caption), and so on. Variations on presentation and display may also be possible, including for example displaying additional or fewer share recommendations, displaying the share recommendations at a different screen justification/orientation, displaying the share recommendations in a popover user interface element or panel, and so on.

The user interface 800 may include user-selectable elements which enable the user to select or de-select the potential share recipients. For example, tapping (e.g., via a touchscreen interface) the share recipient's contact photo may cause the photo or a border around the photo to become grayed out, indicating the share recipient has been de-selected. The user interface may also include controls to enable the user to select different share mechanisms for different recipients. Thus, for example, the user interface may provide an option which would allow the user to share a photo with a first share recipient via email, with a second share recipient via a mobile application, with a third share recipient via a text message, and so on. After making the selections, the user may select a "share" action to initiate sharing of the photo with each of the selected share recipients via the respective share mechanism/communication channel.

Similar to the user interface 700 in FIG. 7, the user interface 800 may also display, or provide an option to view, an explanation of why a particular share recipient is being recommended. For example, under each recommended recipient the user interface 800 may display a link or button labeled "Why?" When the user selects the "Why?" option, the user might see an explanation such as "Because this person has an interest in the Olympics," any of the explanations mentioned above with reference to FIG. 7, or other explanations depending on the context.

Figures 9A, 9B:
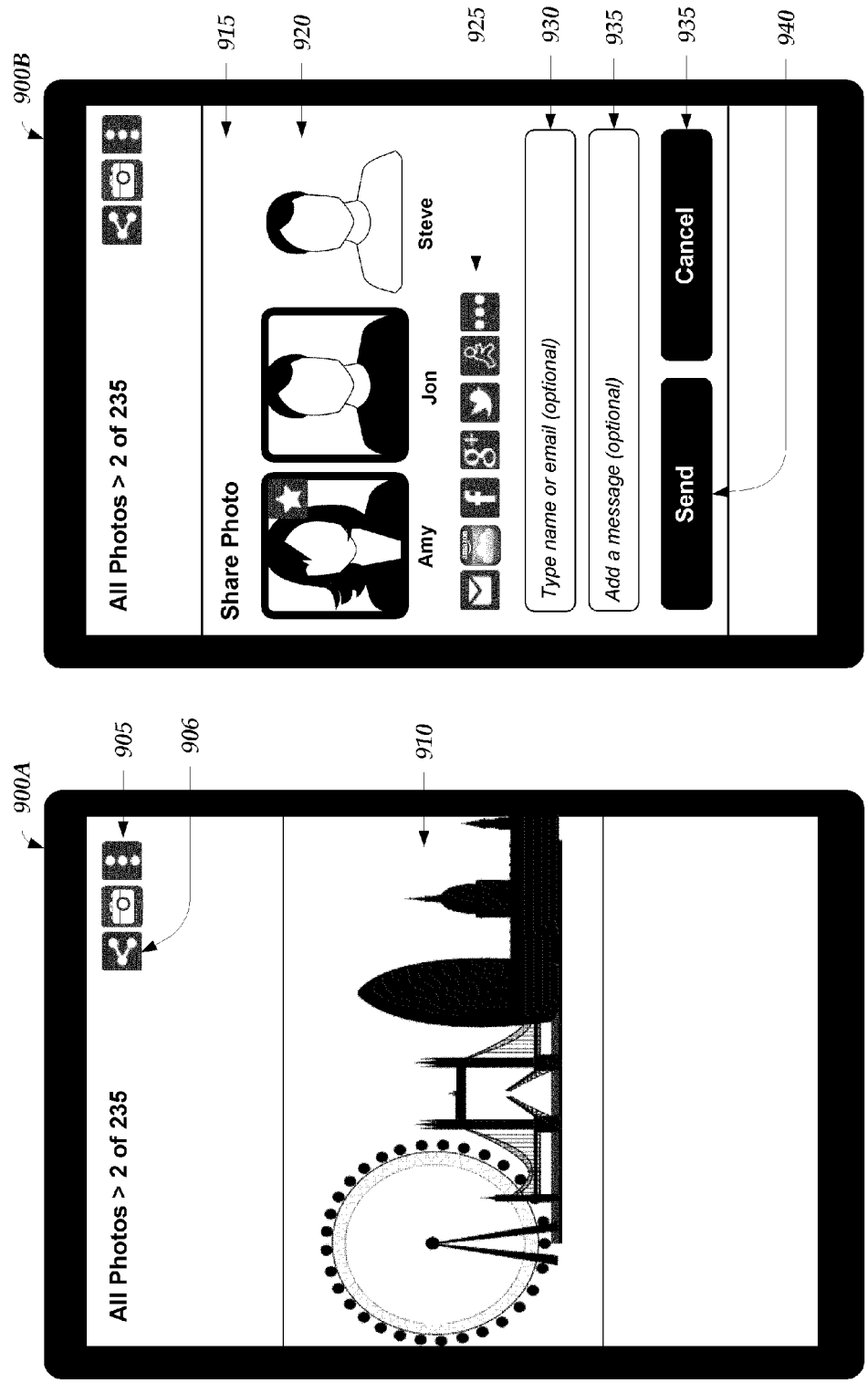
FIGS. 9A and 9B are pictorial diagrams of additional example user interfaces for displaying share recommendations to a user, involving a quick share system such as the quick share system of FIG. 1.

FIGS. 9A and 9B illustrate additional example user interfaces 900A and 900B, respectively, for presenting share recommendations, involving a quick share system such as the quick share system 100 of FIG. 1. The example user interface 900A of FIG. 9A shows an image gallery application displaying an icon menu 905*m* including a share icon 906, and a photo 910 (e.g., a photo of the London skyline). In this example, the user may select the share icon 906 in order to activate a share photo panel or menu, such as the share photo panel 915 shown in user interface 900B of FIG. 9B. In one embodiment, as illustrated, the share photo panel 915 may be displayed over the photo 910, so that the user is not removed from the user experience of browsing his/her image gallery.

With reference to FIG. 9B, the user interface 900B illustrates potential share recipients 920, who may have been identified or suggested by the quick share system 100 via any of the techniques and processes described herein. The user interface 900B also displays a number of share icons 925 which the user may select as a communication channel or delivery mechanism by which the photo is to be shared. Other variations on user interface 900B may be possible including more or less information displayed, such as reasons for why the share recommendations are being provided (e.g., based on location, based on event data, based on interest, etc.), additional content which may be appended to the photo when it is shared (e.g., a text caption), and so on. For example, the user interface 900B includes an option for the user to type a name or email 930 to search for additional contacts with whom to share the photo in addition to the selected share recipients 920. As another option, the user interface 900B illustrates an optional text box 935 input for the user to add a message to the shared photo. Other variations on presentation and display may also be possible, including for example displaying additional or fewer share recommendations, displaying the share recommendations at a different screen justification/orientation, and so on.

The user interface 900B may include user-selectable elements which enable the user to select or de-select the potential share recipients. For example, tapping (e.g., via a touchscreen interface) the share recipient's contact photo may cause the photo or a border around the photo to become grayed out or highlighted, indicating the share recipient has been de-selected. The user interface may also include controls to enable the user to select different share mechanisms for different recipients. Thus, for example, the user interface may provide an option which would allow the user to share a photo with a first share recipient via email, with a second share recipient via a mobile application, with a third share recipient via a text message, and so on. After making the selections, the user may select a "Send" button 940 to initiate sharing of the photo with each of the selected share recipients via the respective share mechanism/communication channel.

Or, the user may select the "Cancel" button to leave or close the share photo panel 915 and return to the user interface 900A.

Similar to the user interface 700 in FIG. 7, the user interface 900B may also display, or provide an option to view, an explanation of why a particular share recipient is being recommended. For example, under each recommended recipient the user interface 900B may display a link or button labeled "Why?" When the user selects the "Why?" option, the user might see an explanation such as any of the explanations mentioned above with reference to FIGS. 7 and 8, or other explanations depending on the context.

Additional Embodiments

In general, any of the routines, processes, methods or criteria disclosed herein for selecting share recipients and/or generating share recommendations can be used individually or in combination with any of the other routines, processes, methods or criteria disclosed herein. For example, in one embodiment, a process for generating a share recommendation based on event data may be combined with a process for generating a share recommendation based on image/content analysis such as facial recognition, to generate, for example, a share recommendation for a user to share a photo with a share recipient who appears in the photo and is attending an event where the photo was taken. Or, in another embodiment, a process for generating a share recommendation based on user likes may be combined with a process for generating a share recommendation based on image/content analysis such as facial recognition, to generate, for example, a share recommendation for a user to share a photo with a share recipient who appears in the photo and has liked other photos shared by the user in the past.

In one embodiment, the quick share system 100 may be configured to generate share recommendations for two or more users based on an attribute in common between the two or more users. For example, the quick share system 100 may receive content data from the two or more users indicating that the two or more users are at the same event (e.g., based on the geo-location and/or time stamp associated with each user and/or content items associated with each user, based on facial recognition indicating the two or more users appeared together in a single photo or separately in different photos at the same event, etc.). The quick share system 100 may then generate share recommendations for each of the two or more users to share items (e.g., photos) with each other. As an illustration, two friends attending a wedding may be prompted to share photos taken at the wedding with each other, perhaps because both friends appear in some photos together and/or with persons in the wedding party, and so on.

In some embodiments, the quick share system 100 may be configured differently, include different components or modules, and/or omit some components or modules shown in FIG. 1. For example, in one embodiment, quick share system 100 includes one or more hardware processors in communication with a computer readable medium storing software modules including instructions that are executable by the one or more hardware processors, and one or more software modules. The one or more hardware processors may include, for example, digital logic circuitry. The one or more software modules may instruct a computing system to execute the various methods, approaches, and/or techniques as described herein.

As described above, the quick share system 100 can be implemented by a computing system that includes one or more physical servers or other computing machines, such as several computing machines interconnected via a network. Thus, each of the components depicted in the quick share system 100 can include hardware and/or software for performing various features. In one embodiment, the quick share system 100 is implemented in association with a web site or collection of web sites. Various disclosed features can be incorporated into a mobile device operating system, a mobile application, a photo sharing site or service, a social networking service, a photo organization program, or any combination of these.

The quick share system 100 can include one or more servers for receiving and responding to network requests from the user computing device(s) 105. The one or more servers can include web servers, application servers, database servers, combinations of the same, or the like. In some embodiments, the network 160 is a publicly accessible network of linked networks, possibly operated by various distinct parties, such as the Internet. In other embodiments, the network 160 may be a private network, such as, for example, a corporate or university network that is wholly or partially inaccessible to non-privileged users. In still other embodiments, the network 160 may include one or more private networks with access to and/or from the Internet. User computing devices 105 may be any type of personal computer or mobile computing device (such as a smart phone, tablet, electronic book reader, or any other type of portable computing device).

The processing of the various components of the quick share system 100 can be distributed across multiple machines, networks, and other computing resources. The various components of the quick share system 100 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, the quick share system 100 may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

In some embodiments, the quick share system 100 may be implemented on, or in communication with, one or more hosted computing environments. The hosted computing environments may include a collection of rapidly provisioned and released computing resources hosted in connection with the quick share system 100. Such computing resources may be referred to, individually, as host computing devices. The computing resources may further include a number of computing, networking and storage devices in communication with one another. In some embodiments, the computing devices may correspond to physical computing devices. In other embodiments, the computing devices may correspond to virtual machine instances implemented by one or more physical computing devices. In still other embodiments, computing devices may correspond to both virtual computing devices and physical computing devices. One example of a hosted computing environment is given in U.S. Pat. No. 7,865,586, issued on Jan. 4, 2011 and entitled "Configuring Communications Between Computing Nodes," which is hereby incorporated by reference in its entirety. A hosted computing environment may also be referred to as a cloud computing environment.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable medium or tangible computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

CONCLUSION

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A system for providing share recommendations for a user, the system comprising:
a computing system comprising one or more processors, the computing system programmed with executable program instructions to at least:
access a digital photograph stored on a user computing device of a sharing user;
identify a photographed subject of the digital photograph by analyzing image data of the digital photograph, wherein the photographed subject is a person and is identified by application of a facial recognition process to the image data;
select a contact of the sharing user as a potential share recipient of the digital photograph, wherein the contact is a person other than the photographed subject;
determine a share potential of the digital photograph with respect to the selected contact at least partly by (a) determining whether an association exists between the photographed subject and the selected contact, and (b) determining whether a geo-location of the digital photograph corresponds to a geolocation associated with the selected contact; and
output to the sharing user, via a user interface of the user computing device, a recommendation of the selected contact as a share recipient of the digital photograph, the recommendation based on the determined share potential.

2. The system of claim 1, wherein the association is a social network connection between the photographed subject and the contact.

3. The system of claim 1, wherein the user interface includes functionality for the sharing user to accept the recommendation and to send the digital photograph to the selected contact.

4. The system of claim 1, wherein the computing system is further programmed to select, based on information regarding communication channels to which the selected contact has access, a recommended communication channel for sharing the digital photograph with the selected contact.

5. The system of claim 1, wherein the computing system is further programmed to select, based on information associated with the selected contact, a communication channel by which the digital photograph is to be sent to the contact, and wherein the communication channel is selected from a group comprising at least an email, a text or SMS message, an application, a web service or a physical delivery of a physical copy of the digital photograph.

6. A computer-implemented method for generating share recommendations for a user, the computer-implemented method comprising:
accessing a digital image stored on a user computing device;
identifying a subject of the digital image by analyzing image content of the digital image, wherein the subject is an individual or a location;
identifying a potential share recipient of the digital image, the potential share recipient being a person other than the identified subject;
determining a share potential of the digital image to be shared with respect to the potential share recipient, wherein determining the share potential comprises (a) determining whether an association exists between the subject and the potential share recipient, and (b) determining whether a geo-location of the digital image corresponds to a geolocation associated with the potential share recipient; and
generating a share recommendation to share the digital image with the potential share recipient based at least in part on the determined share potential,
wherein the method is performed programmatically by a computing system that comprises one or more processors.

7. The computer-implemented method of claim 6, wherein the share recommendation is generated automatically in response to determining that a location associated with the potential share recipient is the subject of the digital image.

8. The computer-implemented method of claim 6, wherein the share recommendation comprises a communication channel by which the digital image is to be sent to the potential share recipient.

9. The computer-implemented method of claim 8, wherein the communication channel is selected from a group comprising at least an email, a text message, an application, a web service or a physical delivery of a physical copy of the digital image.

10. The computer-implemented method of claim 6, wherein the share potential is determined based at least in part on a matching of a geo-location of the digital image to a geo-location associated with the potential share recipient.

11. The computer-implemented method of claim 6, further comprising:
generating caption text for the digital image based at least in part on content data for the digital image, and wherein the share recommendation includes the caption text to be shared with the digital image.

12. The computer-implemented method of claim 6, further comprising:
accessing a user profile for a sharing user, wherein the user profile includes a current location and a share history of the sharing user including a list of past share recipients, and wherein the share potential is determined based at least in part on a comparison of the current location to past locations from which the sharing user shared content items with the past share recipients.

13. The computer-implemented method of claim 12, wherein the share recommendation is generated based at least partly on an automated determination that the potential share recipient is on the list of past share recipients.

14. The system of claim 1, wherein the computing system is programmed to output the recommendation by displaying a representation of the selected contact via a user interface display that provides functionality for designating one or more recipients to whom to send the digital photograph.

15. Non-transitory computer storage having stored thereon an executable computer program that instructs a computing system comprising one or more processors to perform an automated process that comprises:
detecting, by analyzing image data of a digital photograph associated with a user, a photographed subject of the digital photograph, wherein the photographed subject is a person or a location;
identifying, based on user profile data associated with contacts of the user, a contact that is a potential share recipient of the digital photograph, the contact being a person other than the photographed subject;
determining a share potential of the digital photograph with respect to the contact, wherein determining the share potential comprises (a) determining whether an association exists between the photographed subject and the contact, and (b) determining whether a geo-location of the digital photograph corresponds to a geolocation associated with the contact; and recommending said contact to the user, via a user interface for sharing photographs, as a share recipient of the digital photograph based at least partly on the determined share potential.

16. The non-transitory computer storage of claim 15, wherein detecting the photographed subject comprises applying a facial recognition algorithm to the digital photograph.

17. The non-transitory computer storage of claim 15, wherein the automated process further comprises recommending to the user, based on data associated with the contact, a communication channel for sharing the digital photograph with the contact.

* * * * *